(12) United States Patent  
Liao et al.

(10) Patent No.: US 9,300,781 B1  
(45) Date of Patent: Mar. 29, 2016

(54) PORTABLE ELECTRONIC DEVICE AND CONTROL METHOD THEREOF

(71) Applicant: HTC Corporation, Taoyuan County (TW)

(72) Inventors: Chi-Yi Liao, Taoyuan County (TW); Hsin-Hao Lee, Taoyuan County (TW)

(73) Assignee: HTC Corpoation, Taoyuan (TW)

( * ) Notice: Subject to any disclaimer, the term of this patent is extended or adjusted under 35 U.S.C. 154(b) by 0 days.

(21) Appl. No.: 14/576,222

(22) Filed: Dec. 19, 2014

(51) Int. Cl.  
*H04B 1/38* (2015.01)  
*H04M 1/725* (2006.01)

(52) U.S. Cl.  
CPC ................................ *H04M 1/72519* (2013.01)

(58) Field of Classification Search  
None  
See application file for complete search history.

(56) References Cited

U.S. PATENT DOCUMENTS

| | | | | |
|---|---|---|---|---|
| 8,243,961 B1 * | 8/2012 | Morrill | ............... | H04M 1/6041 379/433.03 |
| 8,588,434 B1 * | 11/2013 | Morrill | ............... | H04M 1/6041 379/433.03 |
| 2008/0140868 A1 * | 6/2008 | Kalayjian | ............. | G06F 1/1698 710/8 |
| 2013/0072265 A1 | 3/2013 | Deluca | | |
| 2013/0295906 A1 * | 11/2013 | Chen | ........................ | G01S 11/14 455/418 |
| 2014/0064506 A1 * | 3/2014 | Ryu | ..................... | H04M 1/6016 381/66 |
| 2014/0185852 A1 * | 7/2014 | Pereira | ..................... | H04R 5/04 381/333 |
| 2015/0181338 A1 * | 6/2015 | Hosoi | .................... | H04R 5/033 381/309 |
| 2015/0372656 A1 * | 12/2015 | Mow | ........................ | H03H 7/38 455/77 |

* cited by examiner

*Primary Examiner* — Fayyaz Alam  
(74) *Attorney, Agent, or Firm* — CKC & Partners Co., Ltd.

(57) ABSTRACT

The present invention discloses a portable electronic device and a control method thereof. The portable electronic device includes a main body, a proximity sensor, a first speaker, a first microphone, an orientation sensor, and a processor. The main body includes first and the second sides opposing to each other. The proximity sensor, the first speaker, and the first microphone are disposed in the first side region. The orientation sensor is configured to determine an orientation of the main body. When the orientation represents that the second side is higher than the first side, the processor disables the proximity sensor and the first speaker, and it enables the first microphone to detect the received sound volume as the basis of a proximity sensing function.

24 Claims, 6 Drawing Sheets

PORTABLE ELECTRONIC DEVICE AND CONTROL METHOD THEREOF

BACKGROUND

1. Field of Invention

The present invention relates to an electronic device. More particularly, the present invention relates to a portable electronic device.

2. Description of Related Art

With the advancement of the development of portable electronic devices (such as mobile phones, tablet PCs, wearable devices, etc.), the portable electronic device integrated with wireless voice communication is one of the leading trends nowadays.

Take mobile phones for example, during voice communication, the user's face is often very close to the screen of the mobile phone; in this case, the proximity sensor of the mobile phone disables the screen so as to save the power and prevent the unintentional input resulted from the touch of the user's ears or face. However, when the mobile phone receives an incoming call, the user may retrieve the mobile phone from the bag or pocket and hence may accidentally hold the phone upside down; in this instance, the user cannot answer the phone call; also, the proximity sensor is placed at the lower position, and hence, thus it cannot accurately determine whether the mobile phone is in proximity to the user's face.

In view of the foregoing, there exist problems and disadvantages in the related art for further improvement; however, those skilled in the art sought vainly for a suitable solution. In order to solve or circumvent above problems and disadvantages, there is an urgent need in the related field to provide means for improving the user experience.

SUMMARY

In one aspect, the present disclosure provides a portable electronic device and a method for controlling the same to solve or circumvent aforesaid problems and disadvantages.

According to the present disclosure, the portable electronic device comprises a main body, a proximity sensor, a first speaker, a first microphone, an orientation detector, and a processor. The main body has first and the second sides opposing to each other; the proximity sensor, the first speaker, and the first microphone are disposed at the first side. The orientation detector is configured to determine the orientation of the main body; when the orientation represents that the second side is higher than the first side, the processor turns off the proximity sensor and the first speaker, and enables the first microphone to detect the received sound volume as the basis of a proximity sensing function.

On the other hand according to the present disclosure, the method for controlling a portable electronic device comprises the steeps of, detecting an orientation of a main body; when the orientation represents that the second side is higher than the first side, it turns off the proximity sensor and the first speaker, and enables the first microphone to detect the received sound volume as the basis of a proximity sensing function.

In view of the foregoing, the present invention start from the aim of improving the user experience, in the case where the user holds the portable electronic device upside down, the proximity sensor placed at the lower position is disabled. On the other hand, while answering the phone, the user often answers with short phrases such as "hello" and "yes," and accordingly, the first microphone receives a voice volume of a certain level; in this way, the present invention may determine whether the portable electronic device is in proximity to the user's face judging from the level of the voice volume.

Many of the technical features of the present invention will be further explained by reference to the following detailed description regarding the above-mentioned summary.

BRIEF DESCRIPTION OF THE DRAWINGS

The present description will be better understood from the following detailed description read in light of the accompanying drawing, wherein.

DETAILED DESCRIPTION

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

Figure 2:
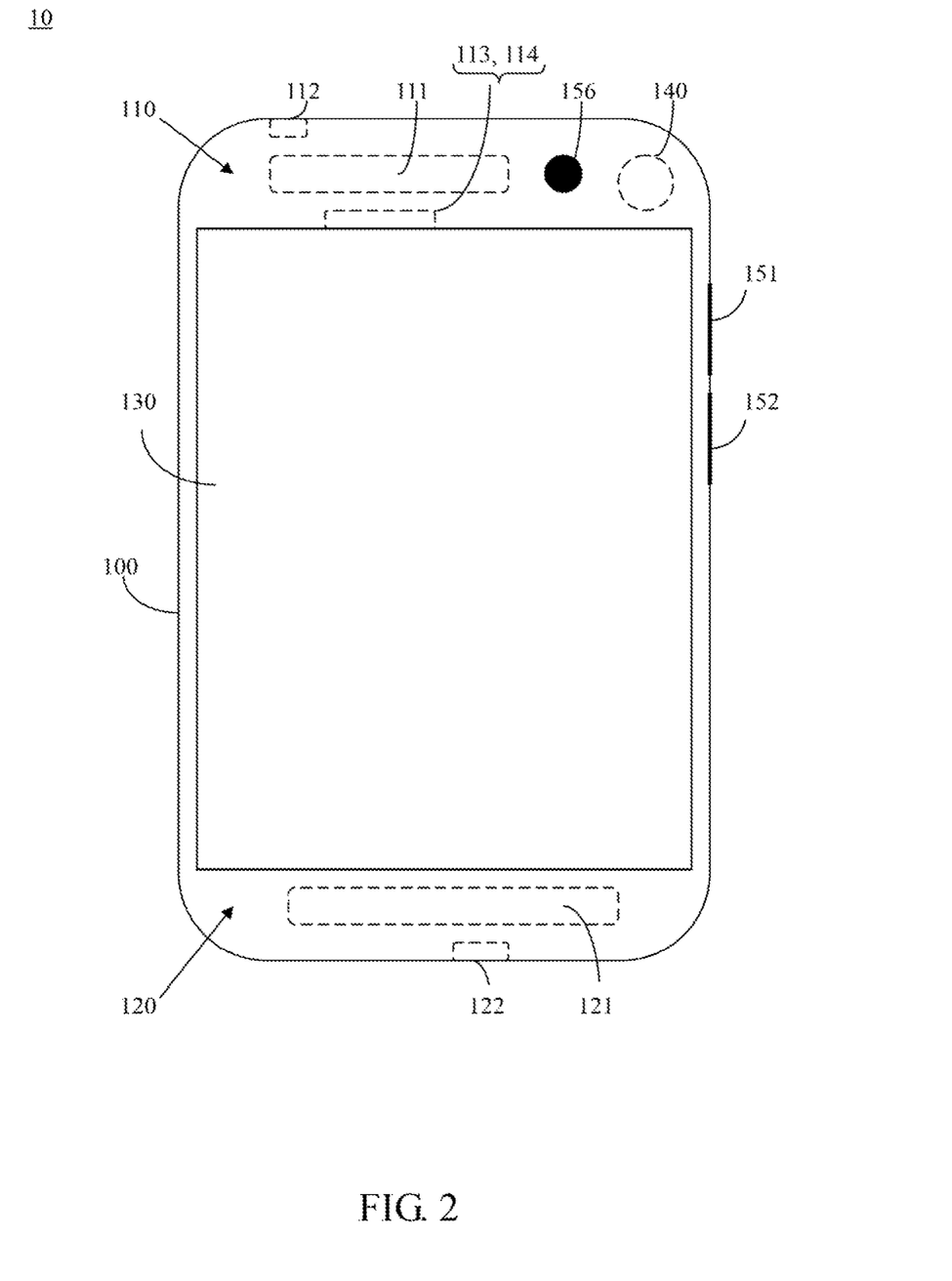
FIG. 2 is a front-view diagram of a portable electronic device in a first orientation according to one embodiment of the present disclosure.
Figure 3:
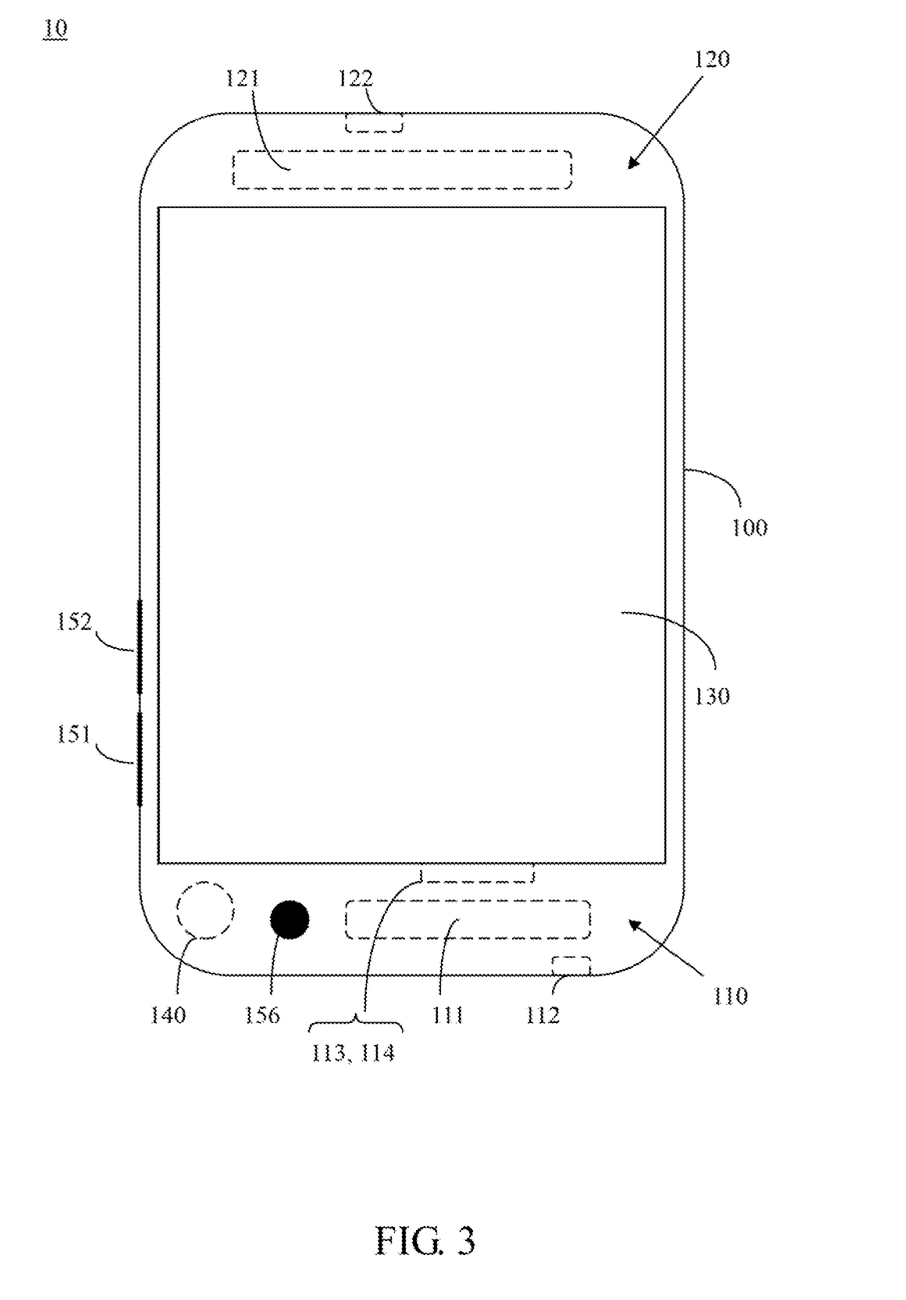
FIG. 3 is a front-view diagram of a portable electronic device in a second orientation according to one embodiment of the present disclosure.
Figure 4:
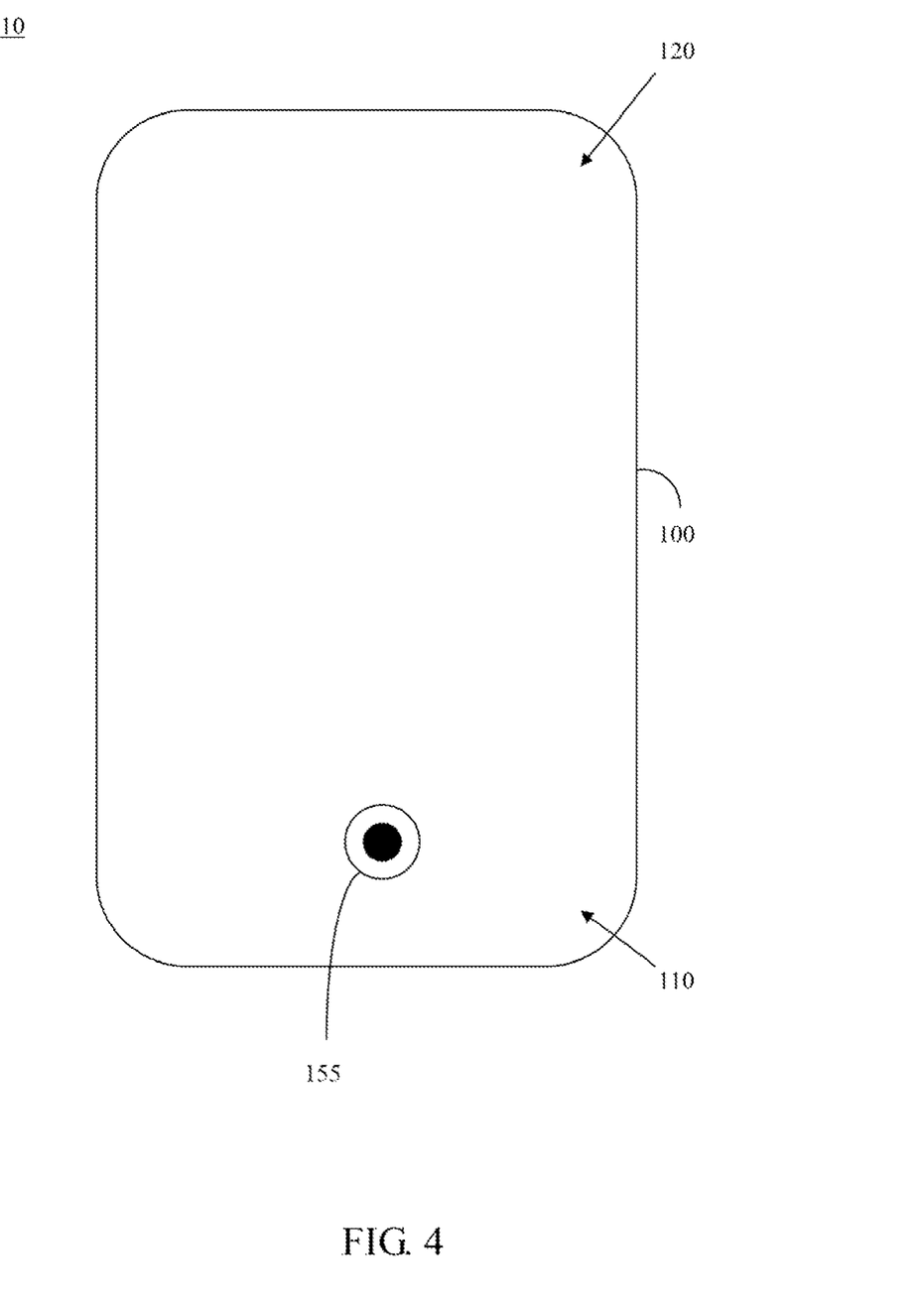
FIG. 4 is a rear-view diagram of a portable electronic device in a second orientation according to one embodiment of the present disclosure.

On technical aspect of the present invention is a portable electronic device, which can be applied in various portable mobile devices (such as, mobile phones, tablets, etc.), or more widely in all sorts of technical settings. It should be noted that no matter whether a user holds the present portable electronic device in a regular or reversed orientation, the portable electronic device allows the user to carry out voice communication successfully and performs proximity sensing effectively. Hereinafter, FIG. 1 is referenced to discuss the basic hardware infrastructure of the present portable electronic device, and then FIG. 2 is used to describe the function of the portable electronic device in the first orientation (the regular orientation); on the other hand, FIG. 3 and FIG. 4 are provided to explain the function of the portable electronic device in the second orientation (the reversed orientation).

Figure 1:
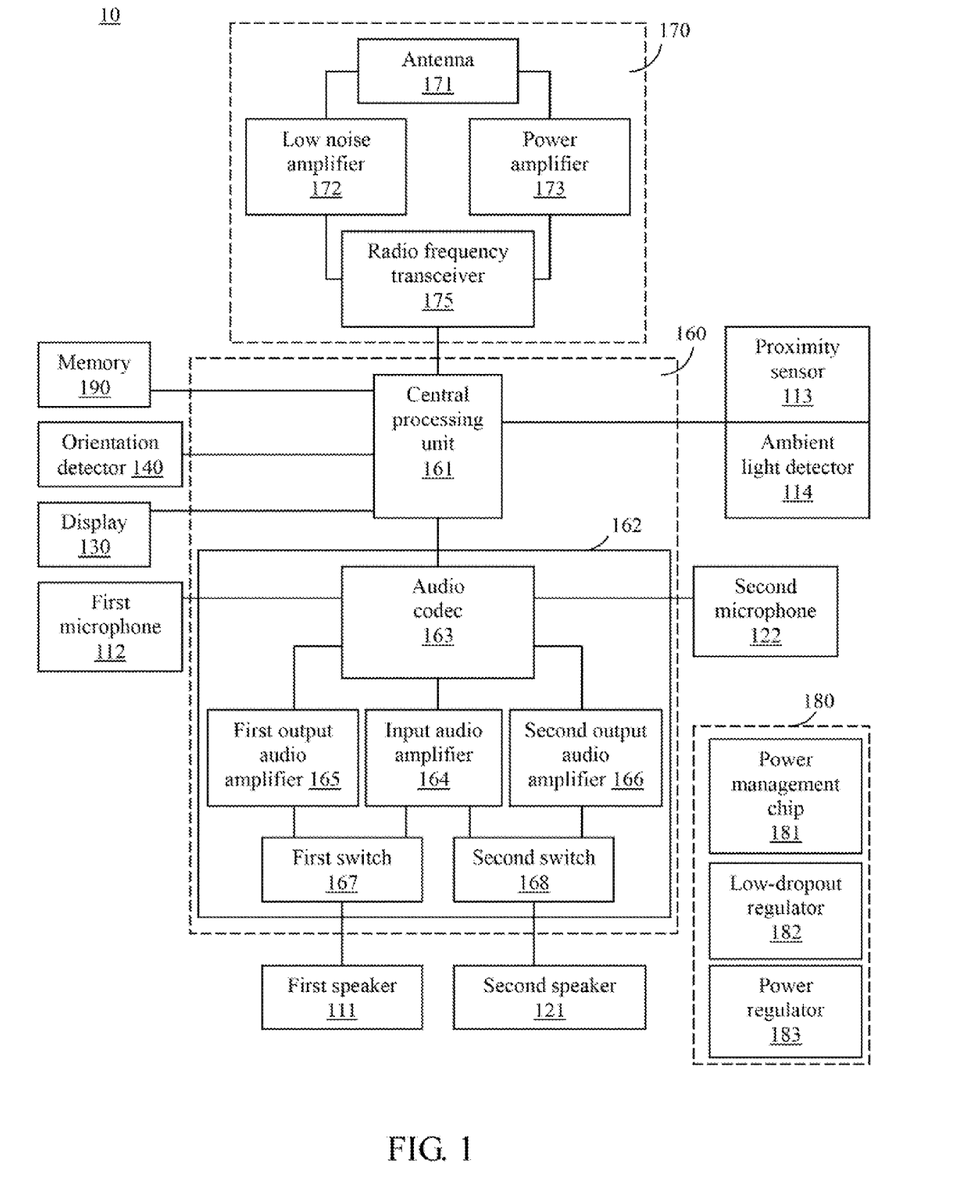
FIG. 1 is a block diagram of a portable electronic device according to one embodiment of the present disclosure.

FIG. 1 is a block diagram illustrating a portable electronic device 10 according to one embodiment of the present disclosure. As illustrated in FIG. 1, the portable electronic device 10 comprises a first speaker 111, a second speaker 121, a first microphone 112, a second microphone 122, a proximity sensor 113, ambient light detector 114, a display 130, an orientation detector 140, a processor 160, a communication unit 170, power management unit 180, and a memory 190. Structurally, the first speaker 111, the second speaker 121, the first microphone 112, the second microphone 122, the proximity sensor 113, the ambient light detector 114, the display 130, the orientation detector 140, the communication unit 170, and the memory 190 are electrically coupled with the processor 160 respectively.

During use, the display 130 such as a touch screen) is configured to display a content or allow the user to operate, the proximity sensor 113 is configured to carry out the proximity sensing function, the ambient light detector 114 is configured to detect the ambient light source, so that the processor 160 is configured to adjust the brightness of the display 130 accordingly.

The communication unit 170 is mainly configured to carry out wireless communication; for example, when the communication unit 170 receives an incoming call request, the user may press the "accept" key displayed on the display to accept the incoming call request, and the communication unit 170 starts to establish the voice communication. It should be noted that "receiving" and "accepting" an incoming call request has different meanings in terms of communication; persons having ordinary skill in the art should be able to ascertain the difference therebetween.

The orientation detector 140 is configured to determine the spatial orientation (e.g., the operating state) of the main body of the portable electronic device 10; in one embodiment, when the orientation detector 140 determines that the orientation of the main body of the portable electronic device 10 is reversed, the processor 160 makes the content displayed on display 130 reverse accordingly.

The memory 190 includes a computer program executable by the processor 160, and when the computer program is executed by the processor 160, it makes the processor 160 carry out various functions; for example, using the voice communication, the processor 160, based on the orientation of the main body of the portable electronic device 10, uses one of the microphones 112 and 122 to receive a voice input while uses the other to receive environmental noise that is used as the basis of call noise reduction; and the processor 160 based on the orientation, uses one of the speakers 111 and 121 as a phone receiver while disables the other. Also, the power management unit 180 is configured to manage the power of the portable electronic device 10.

In FIG. 1, the communication unit 170 comprises an antenna 171, a low noise amplifier 172, a power amplifier 173, and a radio frequency transceiver 175. Structurally, the antenna 171 is electrically coupled to the low noise amplifier 172 and the power amplifier 173; the low noise amplifier 172 and the power amplifier 173 are electrically coupled to the radio frequency transceiver 175. During use, the signaled received by the antenna 171 is amplified by the low noise amplifier 172 and then transmitted to the radio frequency transceiver 175; the signal sent by the radio frequency transceiver 175 is amplified by the power amplifier 173 and then transmitted by the antenna 171 wirelessly.

In FIG. 1, the processor 160 generally covers a central processing unit (CPU) 161 and an audio processing unit 162; the audio processing unit 162 comprises an audio codec 163, an input audio amplifier 164, a first output audio amplifier 165, a second output audio amplifier 166, a first switch 167, and a second switch 168.

Structurally, the central processing unit 161 is electrically coupled to the audio codec 163; the audio codec 163 is electrically coupled to the input audio amplifier 164, the first output audio amplifier 165, and the second output audio amplifier 166; the input audio amplifier 164 is electrically coupled to the second switch 168; the first output audio amplifier 165 is electrically coupled to the first switch 167; the second output audio amplifier 166 is electrically coupled to the second switch 168; the first switch 167 is electrically coupled to the first speaker 111; and the second switch 168 is electrically coupled to the second speaker 121.

During use, the audio signal received by the communication unit 170 is processed by the audio codec 163 and then amplified by the input audio amplifier 164; and then the switches 167 and 168 are used to select one of the first speaker 111 or the second speaker 121 as the phone receiver. Alternatively, when the portable electronic device 10 is in the loudspeaker mode, the first output audio amplifier 165 and the second output audio amplifier 166 amplify the signal, and then switches 167 and 168 are used to select the first speaker 111 or the second speaker 121 for sound amplification.

In Figure, the power management unit 180 comprises a power management chip 181, a Low-dropout regulator 182, and a power regulator 183. The power management chip 181 is configured to manage the battery power of the portable electronic device 10; the Low-dropout regulator 182 is configured to use the transistor(s) operating in the linear region of the Low-dropout regulator to subtract the excess voltage from the applied input voltage; and then, the power regulator 183 is configured to generate a regulated output voltage.

FIG. 2 is a front-view diagram of a portable electronic device 10 in a first orientation according to one embodiment of the present disclosure. Structurally, the main body 100 of the portable electronic device 10 has a first side 110 and a second side 120 opposing to the first side; a first speaker 111; a first microphone 112; a proximity sensor 113; an ambient light detector 114 disposed at the first side 110; a second speaker 121 and a second microphone 122, both disposed at the second side 120; a display 130 disposed at the front face of the main body 110.

During use, the orientation detector 140 is configured to determine the spatial orientation of the main body 100; as illustrated in FIG. 2, the main body 100 is in the first orientation (i.e., a regular or vertical orientation), meaning that the first side 110 is higher than the second side 120.

Referring to both FIG. 1 and FIG. 2, when the user picks up the portable electronic device 10 to answer the phone, the first side 110 is often close to the user's ear. Accordingly, when the portable electronic device 10 is in the first orientation, the processor 160 disables the second speaker 121 at the second side 120 and enables the first speaker 111, the first microphone 112, and the proximity sensor 113 at the first side 110 and the second microphone 122 at the second side 120, in which the first speaker 111 is used as the phone receiver, the first microphone 112 receives the environmental noise as the basis of call noise reduction, the second microphone 122 receives the user's voice input, the proximity sensor 113 performs the proximity sensing for determining whether the portable electronic device 10 is in proximity to the user's face. When positive, the portable electronic device 10 automatically turns off the display 130 (such as a touch screen) or disables the touch function, so as to save the power consumption and prevent the user's ear or face from unintentionally triggering the touch screen.

In FIG. 2, the first volume key 151 and the second volume key 152 are disposed at the main body 100, in which the first volume key 151 is closer to the first side 110 than the second volume key 152. During use, the volume keys 151 and 152 are configured to adjust the volume of the speakers 111 and 121. Hence, in the first orientation, when the proximity sensor 113 is used as the reference point, it could be appreciated that the first side 110 is higher than the second side 120; and in this case, the processor 160 sets the first volume key 151 located at a higher position as the volume-up key, while sets the second volume key 152 located at a lower position as the volume-down key, so as to facilitate the user's intuitive operation.

FIG. 3 is a front-view diagram of a portable electronic device 10 in a second orientation according to one embodiment of the present disclosure. As illustrated in FIG. 3, the second orientation is rotated about 180 degrees from the first orientation, when the user holds the portable electronic device 10 upside down, the portable electronic device 10 is substantially in the second orientation; that is, in a reversed orientation.

Referring to both FIG. 1 and FIG. 3, when the user holds the portable electronic device 10 upside down in an attempt to answer the call, the second side 120 is close to the user's ear; however, due to the curve of the face, there is a small distance between the first side 110 and the lower face, or when the length of the portable electronic device 10 exceeds the distance between the user's ear and jaw, the proximity sensor 113 at the first side 110 cannot effectively determine whether the portable electronic device 10 is actually close to a human face. Therefore, in one embodiment, the processor 160 automatically turns off the proximity sensor 113, to prevent the waste of power; further, the processor 160 enables the first microphone 112, the second microphone 122, and the second speaker 121, and turns off the first speaker 111 in which the second speaker 121 is used as the phone receiver, the second microphone 122 receives the environmental noise as the basis of call noise reduction. Moreover, when taking the call, the user often answers with phrases such as "yes" and "hello"; in this case, the first microphone 112 receives a voice volume of a certain level, and the processor 160 uses the voice volume received by the first microphone 112 as the basis of proximity sensing, which is used to determine whether the portable electronic device 10 is close to the user's face. In one embodiment, before the voice communication is ended, when the voice volume is greater than a pre-determined volume value, it means that the portable electronic device 10 is close to the user's face thereby receiving the user's voice, and hence, the processor 160 automatically turns off the display 130 (such as a touch screen) or disables the touch function, so as to save the power consumption and prevent the user's ear or face from unintentionally triggering the touch screen.

In FIG. 3, the first volume key 151 is closer to the first side 110 than the second volume key 152; however, in the second orientation, also using the proximity sensor 113 as the reference point, the second side 120 is higher than the first side 110, and hence, the processor 160 uses the first volume key 151 located at the lower position as the volume-down key, while uses the second volume key 152 located at the higher position as the volume-up key, so as to facilitate the user's intuitive operation.

FIG. 4 is a rear-view diagram of a portable electronic device 10 in a second orientation according to one embodiment of the present disclosure. As illustrated in FIG. 4, the capturing component 155 is disposed at the rear face of the main body 100 and close to the first side 110. During use, the capturing component 155 disposed at the rear face is often used as the main camera, which, in comparison with the front camera 156 (illustrated in FIG. 3) is capable of capture images with greater pixels.

Referring to FIGS. 1, 3 and 4, when the user holds the portable electronic device 10 upside down in an attempt to answer the call, the user's palm usually shields the capturing component 155. Therefore, in one embodiment, during the period of the voice communication, the processor 160 enables the capturing component 155 to determine whether the capturing component 155 is shielded based on the image brightness detected by the capturing component 155. Before the end of the voice communication, when the voice volume received by the first microphone 112 is higher than the pre-determined volume value and the image brightness detected by the capturing component 155 is lowered than a pre-determined brightness value, it represents that the user should hold the portable electronic device 10 closer to the face to allow the voice communication, and hence, the processor 160 automatically turns off the display 130, so as to more accurately determines the user's phone-answering behavior.

Furthermore, the user often operates on the display 130 during the voice communication; for example, the user may search for contact information, read an email or browse the content of an album, searching for data using the internet connection, etc. Thus, in one embodiment, the orientation detector 140 may be an acceleration transducer; after the display 130 is turned off and when the triaxial acceleration of the acceleration transducer exceeds a pre-determined range, meaning that the user switches from the action of answering the call to the action of operating on the display 130, or the user enables the loudspeaker mode for the voice communication and operates on the display 130; in this instance, the processor 160 turns the display 130 back on to facilitate the viewing and operating actions of the user.

For example, in order to accurately determine that whether the user is switching to the action of operating on the display 130, for example, the triaxial acceleration signal generated by the acceleration transducer when the user moves the portable electronic device 10 away from the ear is first obtained. The triaxial acceleration signal includes the value of X-coordinate, the value of Y-coordinate, and the value of Z-coordinate. When the value of X-coordinate, the value of Y-coordinate, and the value of Z-coordinate respectively exceed three sets of pre-determined range, the processor 160 determines that the user is operating on the display 130, and therefore turns on the display 130.

However, if the user is answering the call while he or she is doing some regular exercise such as walking, a misjudgment may arise. Therefore, in one embodiment, after the display 130 is turned off, when the triaxial acceleration of the acceleration transducer exceeds the pre-determined range but performs a regular variation (meaning that the user is walking or doing some other regular actions, instead of operating on the display 130), the processor 160 keeps the display 130 turned-off. On the other hand, when the triaxial acceleration of the acceleration transducer exceeds the pre-determined range but does not perform a regular variation (meaning that the user is operating on the display 130), the processor 160 turns the display back on to facilitate the user's operation.

Figure 5:
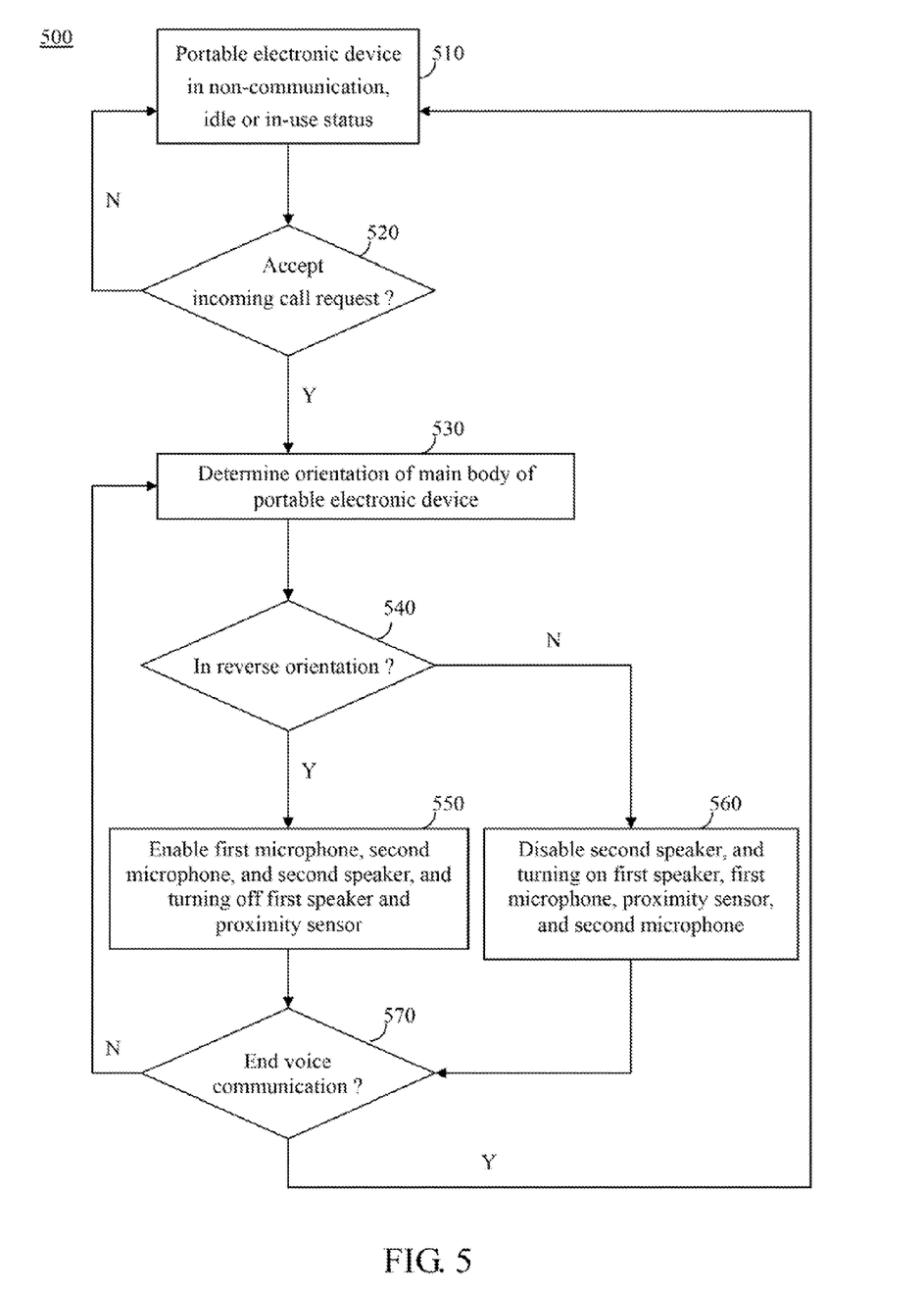
FIG. 5 is a flow chart illustrating a method for controlling a portable electronic device according to one embodiment of the present disclosure.

FIG. 5 is a flow chart illustrating a control method 500 for controlling a portable electronic device 10 according to one embodiment of the present disclosure. The control method 500 can be implemented as at least one computer program and stored in the memory 190 of the portable electronic device 10 illustrated in FIG. 1; the computer program, while executed by the processor 160, cause the processor 160 to perform the control method 500. As could be appreciated, for the steps 510 to 570 described in the control method 500, the sequence in which these steps is performed, unless explicitly stated otherwise, can be altered depending on actual needs; in certain cases, all or some of these steps can be performed concurrently. As to the hardware devices required for the implementation of these steps, they have been specifically disclosed in the above-mentioned embodiments, and hence will not be repeated hereinbelow.

Referring to both FIG. 3 and FIG. 5, first, in step 510, the portable electronic device 10 is in a non-communication, idle or in-use status. Next, in step 520, it is determined that whether to accept an incoming call request; when the incoming call request is accepted, a voice communication is established accordingly; to the contrary, when the incoming call request is not accepted, returns to step 510, so that the portable electronic device 10 is returned to the non-communication, idle or in-use status. After the incoming call request is accepted, in step 530, the orientation of the main body 100 of the portable electronic device 10 is determined; and then, in step 540, it is determined that whether the orientation is in a reversed orientation.

When the main body 100 of the portable electronic device 10 is in the reversed orientation (meaning that the second side 120 of the main body 100 is higher than the first side 110), the method foes to step 550, in which during the period of the voice communication, the first microphone 112, the second microphone 122, and the second speaker 121 are enabled, and the first speaker 111 and the proximity sensor 113 are disabled, in which the second speaker 121 is used as the phone receiver, the second microphone 122 receives the environmental noise as the basis of call noise reduction. Further, since the user often answers the call with phrases such as "yes" and "hello", the first microphone 112 receives a voice volume of a certain level, and hence, in step 550, the voice volume received by the first microphone 112 is used as the basis of proximity sensing, which is used to determine whether the portable electronic device 10 is close to the user's face.

Moreover, in the reversed orientation, the second side 120 is higher than the first side 110, and thus, in step 550, the first volume key 151 located at a lower position is set as the volume-down key, while the second volume key 152 located at a higher position is set as the volume-up key, so as to facilitate the user's intuitive operation. Further, when the orientation detector 140 determines that the orientation of the main body 100 is reversed, in step 550, the display 130 is turned on, and the content displayed thereon is rotate 180 degrees accordingly, so as to facilitate the viewing and operation of the user.

On the other hand, referring to FIG. 2 and FIG. 5, when the orientation of the main body 100 of the portable electronic device 10 is in a regular, vertical orientation (meaning that the first side 110 is higher than the second side 120), the method goes to step 560, in which during the period of the voice communication, the second speaker 121 at the second side 120 is disabled, and the first speaker 111, the first microphone 112, the proximity sensor 113 at the first side 110 and the second microphone 122 at the second side 120 are enabled, in which the first speaker 111 is used as the phone receiver, the first microphone 112 receives the environmental noise as the basis of call noise reduction, the second microphone 122 receives the user's voice input, the proximity sensor 113 performs proximity sensing, which is used to determine whether the portable electronic device 10 is close to the us face.

Further, in the regular, vertical orientation, the first side 110 is higher than the second side 120; hence, in step 560, the first volume key 151 located at a higher position is set as the volume-up key, while the second volume key 152 located at the lower position is set as the volume-down key, so as to facilitate the user's intuitive operation After the step 550 or step 560 is performed, in step 570, it is determined that whether the voice communication is ended. When positive, the method returns to step 510, in which the portable electronic device 10 in a non-communication, idle or in-use status; to the contrary, when negative, the method returns to step 540, in which step, the method continues to determine whether the orientation of the main body 100 of the portable electronic device 10 is in the reversed orientation.

Figure 6:
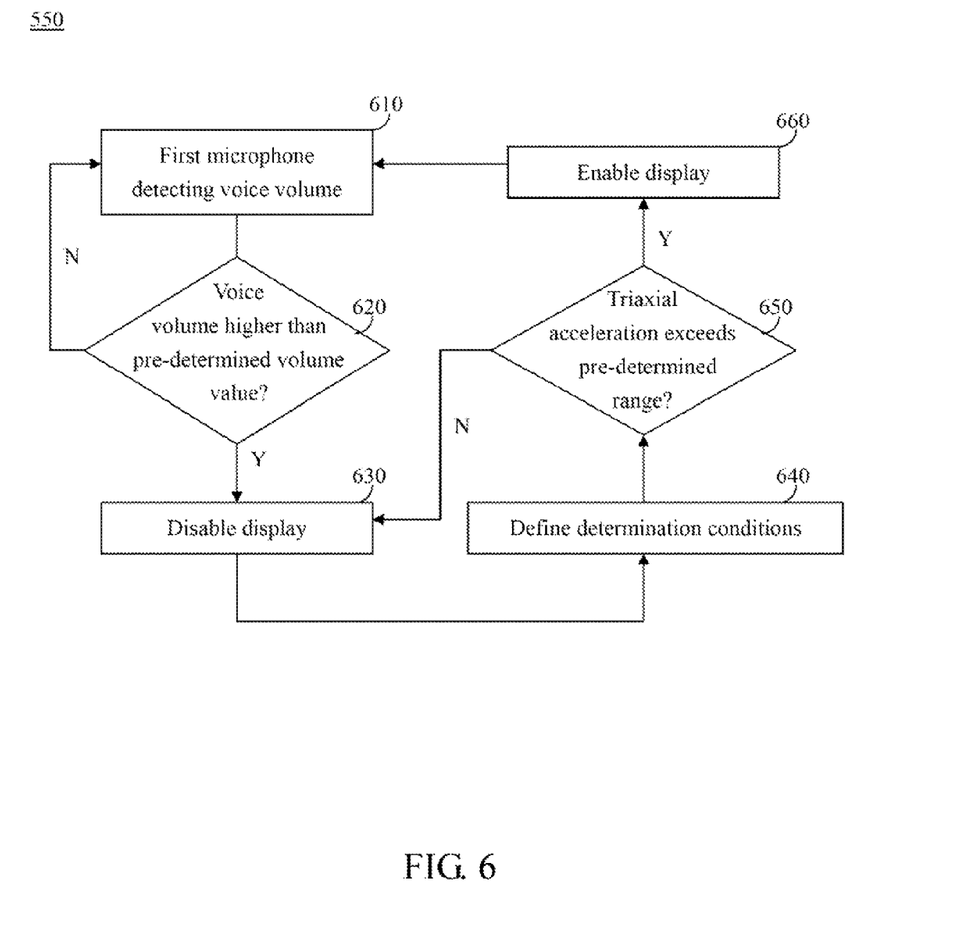
FIG. 6 is a detailed flow chart of the step 550 in FIG. 5.

FIG. 6 is a detailed flow chart of the step 550 in FIG. 5. Referring to FIG. 3 and FIG. 6, in the reversed orientation, in step 610, the first microphone 112 is used to detect the voice volume generated by the user; in step 620, it is determined that whether the voice volume is higher than a pre-determined volume value; when positive (meaning the portable electronic device 10 is close to the user's face and thereby collects the voice), in step 630, the display 130 (such as a touch screen) is automatically disabled or the touch function is automatically disabled, so as to save the power consumption and prevent the user's ear or face from unintentionally triggering the touch screen.

The user often operates on the display 130 during the voice communication; for example, the user may search for contact information, read an email or browse the content of an album, searching for data using the internet connection, etc. Thus, in step 640, the triaxial acceleration of the acceleration transducer is obtained to define the determination conditions; then in step 650, it is determined that whether the triaxial acceleration exceeds a pre-determined range; when the triaxial acceleration exceeds the pre-determined range (meaning that the user switches from the action of answering the call to the action of operating on the display 130, or the user enables the loudspeaker mode for the voice communication and operates on the display 130), in step 660, the display 130 back is turned back on to facilitate the viewing and operating actions of the user.

For example, in order to accurately determine that whether the user is switching to the action of operating on the display 130, in step 640, the triaxial acceleration signal generated by the acceleration transducer when the user moves the portable electronic device 10 away from the ear is first obtained. The triaxial acceleration signal includes the value of X-coordinate, the value of Y-coordinate, and the value of Z-coordinate. In step 650, when it is determined that the value of X-coordinate, the value of Y-coordinate, and the value of Z-coordinate respectively exceed three sets of pre-determined range, in step 660 the display 130 is turned on.

Further, referring to FIGS. 3, 4 and 6, when the user holds the portable electronic device 10 upside down in an attempt to answer the call, the user's palm usually shields the capturing component 155. Therefore, in step 610, during the period of the voice communication, the capturing component 155 is enabled to determine whether the capturing component 155 is shielded based on the image brightness detected by the capturing component 155. Before the end of the voice communication, when in step 620 it is determined that the voice volume received by the first microphone 112 is higher than the pre-determined volume value and the image brightness detected by the capturing component 155 is lowered than a pre-determined brightness value (meaning that the user should hold the portable electronic device 10 closer to the face to allow the voice communication), in step 630, the display 130 is automatically turned off, so as to more accurately determines the user's phone-answering behavior.

On the other hand, if the user is answering the call while he or she is doing some regular exercise such as walking, a misjudgment may arise in step 650. Therefore, after the display 130 is turned off, when in step 650 it is determined that the triaxial acceleration of the acceleration transducer exceeds the pre-determined range but performs a regular variation (meaning that the user is walking or doing some other regular actions, instead of operating on the display 130), the method returns to step 630 in which the display 130 is kept turned-off. On the other hand, when in step 650 it is determined that the triaxial acceleration of the acceleration transducer exceeds the pre-determined range but does not perform a regular variation (meaning that the user is operating on the display 130), the method goes to step 660 in which the display is turned back on so that the user may view the display.

In view of the foregoing, the application of the portable electronic devices according to embodiments of the present disclosure and the present methods for controlling the same has the following advantages:

1. No matter whether the user is holding the present portable electronic device in a regular or reversed orientation, the present portable electronic device allows the user to carry out voice communication smoothly, and facilitates effective proximity sensing; and 2. The present portable electronic device only requires a single proximity sensor. When the user holds the portable electronic device in a regular orientation, the proximity sensor located at the upper position is used for proximity sensing, so as to determine whether the portable electronic device is close to the user's ear. When the user holds the portable electronic device upside down, the present invention disables the proximity sensor located at the lower position, and instead uses the voice volume received by the first microphone as the basis of proximity sensing.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the scope of the present disclosure shall be defined by the accompany claims.

What is claimed is:

1. A portable electronic device, comprising:
    a main body, including a first and the second sides opposing to each other;
    a proximity sensor, a first speaker and a first microphone, disposed at the first side;
    a processor; and
    an orientation detector, configured to determine an orientation of the main body, wherein when the orientation represents that the second side is higher than the first side, the processor turns off the proximity sensor and the first speaker, and the processor enables the first microphone to detect the received sound volume as a basis of a proximity sensing function.

2. The portable electronic device of claim 1, further comprising:
    a second speaker and a second microphone, both disposed at the second side; and
    a communication unit, configured to receive an incoming call request, after the acceptance of the incoming call request, further establish a voice communication, wherein during the voice communication, when the orientation represents that the second side is higher than the first side, the processor enables the second speaker to serve as at least a phone receiver, and enables the second microphone to receive environmental noise as the basis of call noise reduction.

3. The portable electronic device of claim 2, further comprising:
    a display, disposed at a front face of the main body, wherein before the voice communication is ended, when the voice volume is higher than a pre-determined volume value, the processor turns off the display.

4. The portable electronic device of claim 3, wherein the orientation detector is an acceleration transducer, and after the display is turned off, when the triaxial acceleration of the acceleration transducer exceeds a pre-determined range, the processor turns the display back on.

5. The portable electronic device of claim 3, wherein the orientation detector is an acceleration transducer, and after the display is turned off, when the triaxial acceleration of the acceleration transducer exceeds a pre-determined range but performs a regular variation, the processor keeps the display turned-off, or when the triaxial acceleration of the acceleration transducer exceeds a pre-determined range and does not perform the regular variation, the processor turns the display back on.

6. The portable electronic device of claim 2, further comprising:
    at least one capturing component, disposed at a rear face of the main body and close to the first side, wherein during the voice communication, when the orientation represents that the second side is higher than the first side, the processor enables the capturing component to determine whether the capturing component is shielded based on the image brightness detected by the capturing component.

7. The portable electronic device of claim 6, further comprising:
    a display, disposed at a front face of the main body, wherein before the voice communication is ended, when the voice volume is higher than a pre-determined volume value and the image brightness is lower than a pre-determined brightness value, the processor turns off the display.

8. The portable electronic device of claim 7, wherein the orientation detector s an acceleration transducer, and after the display is turned off, when the triaxial acceleration of the acceleration transducer exceeds a pre-determined range, the processor turns the display back on.

9. The portable electronic device of claim 7, wherein the orientation detector is an acceleration transducer, and after the display is turned off, when the triaxial acceleration of the acceleration transducer exceeds a pre-determined range but performs a regular variation, the processor keeps the display turned-off, or when the triaxial acceleration of the acceleration transducer exceeds a pre-determined range but does not perform the regular variation, the processor turns the display back on.

10. The portable electronic device of claim 2, wherein during the voice communication, when the orientation represents that the first side is higher than the second side, the processor disables the second speaker, enables the proximity sensor to perform the proximity sensing, enables the first speaker to serve as the phone receiver, enables the first microphone to receive the environmental noise as the basis of call noise reduction, and enables the second microphone to receive a voice input.

11. The portable electronic device of claim 1, further comprising:
    a display, disposed at a front face of the main body, and whenever the orientation detector detects that the orientation of the main body is reversed, the processor makes the content displayed on the display reverse accordingly.

12. The portable electronic device of claim 1, further comprising:
    a first volume key and a second volume key, both disposed on the main body, wherein the first volume key is closer to the first side than the second volume key, and when the orientation represents that the second side is higher than the first side, the processor sets the first volume key as a volume-down key and sets the second volume key as a volume-up key.

13. A method for controlling a portable electronic device, the portable electronic device comprising a main body, a proximity sensor, a first speaker and a first microphone, the main body including a first and the second sides opposing to each other, the proximity sensor, the first speaker and the first microphone disposed at the first side, the method comprising:
  detecting an orientation of the main body; and
  when the orientation represents that the second side is higher than the first side, turning off the proximity sensor and the first speaker, and enabling the first microphone to detect the received sound volume as a basis of a proximity sensing function.

14. The method of claim 13, wherein the portable electronic device further comprises a second speaker and a second microphone, both disposed at the second side, and the method further comprises:
  receiving an incoming call request, and after the acceptance of the incoming call request, establishing a voice communication; and
  during the voice communication, when the orientation represents that the second side is higher than the first side, enabling the second speaker to serve as at least one phone receiver, and enabling the second microphone to receive environmental noise as the basis of call noise reduction.

15. The method of claim 14, wherein the portable electronic device further comprises a display disposed at a front face of the main body, and the method further comprises:
  before the voice communication is ended, when the voice volume is higher than a pre-determined volume value, the processor turning off the display.

16. The method of claim 15, wherein the orientation detector is an acceleration transducer, and the method further comprises:
  after the display is turned off, when the triaxial acceleration of the acceleration transducer exceeds a pre-determined range, turning the display back on.

17. The method of claim 15, wherein the orientation detector is an acceleration transducer, and the method further comprises:
  after the display is turned off, when the triaxial acceleration of the acceleration transducer exceeds a pre-determined range but performs a regular variation, keeping the display turned-off, or when the triaxial acceleration of the acceleration transducer exceeds a pre-determined range but does not perform the regular variation, turning the display back on.

18. The method of claim 14, wherein the portable electronic device further comprises at least one capturing component disposed at a rear face of the main body and close to the first side, and the method further comprises:
  during the voice communication, when the orientation represents that the second side is higher than the first side, enabling the capturing component to determine whether the capturing component is shielded based on the image brightness detected by the capturing component.

19. The method of claim 18, wherein the portable electronic device further comprises a display disposed at a front face of the main body, and the method further comprises:
  before the voice communication is ended, when the voice volume is higher than a pre-determined volume value and the image brightness is lower than a pre-determined brightness value, the processor turning off the display.

20. The method of claim 19, wherein the orientation detector is an acceleration transducer, and the method further comprises:
  after the display is turned off, when the triaxial acceleration of the acceleration transducer exceeds a pre-determined range, turning the display back on.

21. The method of claim 19, wherein the orientation detector is an acceleration transducer, and the method further comprises:
  after the display is turned off, when the triaxial acceleration of the acceleration transducer exceeds a pre-determined range but performs a regular variation, keeping the display turned-off, or when the triaxial acceleration of the acceleration transducer exceeds a pre-determined range but does not perform the regular variation, turns the display back on.

22. The method of claim 14, further comprising:
  during the voice communication, when the orientation represents that the first side is higher than the second side, the processor disabling the second speaker, turning on the proximity sensor to perform the proximity sensing, enabling the first speaker to serve as the phone receiver, enabling the first microphone to receive the environmental noise as the basis of call noise reduction, and enabling the second microphone to receive a voice input.

23. The method of claim 13, wherein the portable electronic device further comprises a display disposed at a front face of the main body, and the method further comprises:
  whenever the orientation detector detects that the orientation of the main body is reversed, making the content displayed on the display reverse accordingly.

24. The method of claim 13, wherein the portable electronic device further comprises a first volume key and a second volume key, both disposed on the main body, and the first volume key is closer to the first side than the second volume key, and the method further comprises:
  when the orientation represents that the second side is higher than the first side, setting the first volume key as a volume-down key, and setting the second volume key as a volume-up key.

* * * * *